United States Patent [19]

Zomer

[11] 4,377,327
[45] Mar. 22, 1983

[54] SPECTACLE FRAMES

[76] Inventor: Giuseppe Zomer, Via Cerrone 4, Villar Dora (Turin), Italy

[21] Appl. No.: 182,189

[22] Filed: Aug. 28, 1980

[30] Foreign Application Priority Data

Feb. 15, 1980 [IT] Italy ............................... 67231 A/80

[51] Int. Cl.³ .......................... G02C 5/16; G02C 5/14
[52] U.S. Cl. .................................... 351/119; 351/113; 351/114; 351/121
[58] Field of Search ............... 351/113, 114, 119, 121; 2/448, 450

[56] References Cited

U.S. PATENT DOCUMENTS 3,796,482  3/1974  Blumenthal .......................... 351/114

Primary Examiner—John K. Corbin
Assistant Examiner—Rodney Bovernick
Attorney, Agent, or Firm—Sughrue, Mion, Zinn, Macpeak and Seas

[57] ABSTRACT

A spectacle-frame side arm is provided which is capable of lateral articulation intermediate its ends to conform to the shape of the wearer's head. The side arm comprises front and rear parts articulated together, and a longitudinal reinforcing lamina extending between the arm parts at least in their zone of articulation. In order to resist torsional stresses about the longitudinal axis of the side arm, the articulated ends of the side-arm parts are formed as interplaced tenons and mortices which extend perpendicularly to the said longitudinal axis. Preferably, the opposing surfaces of the interplaced tenons are separated from each other by a metal spacer element which has a profile similar to that of the articulated ends of the side-arm parts considered in a plane parallel to the longitudinal median plane of the side arm.

8 Claims, 10 Drawing Figures

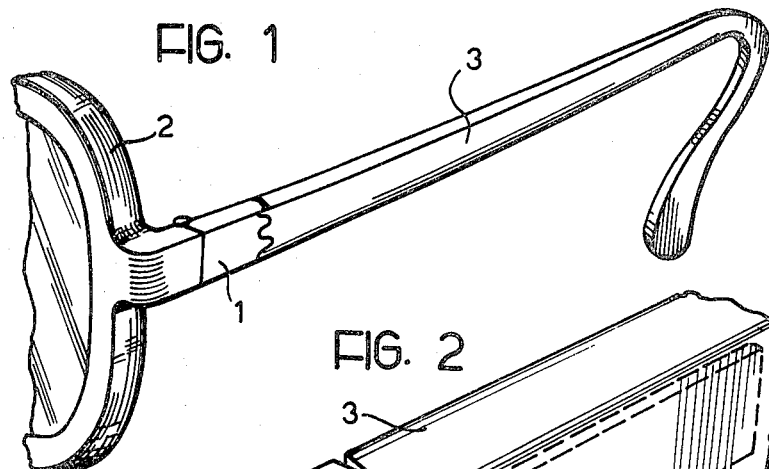
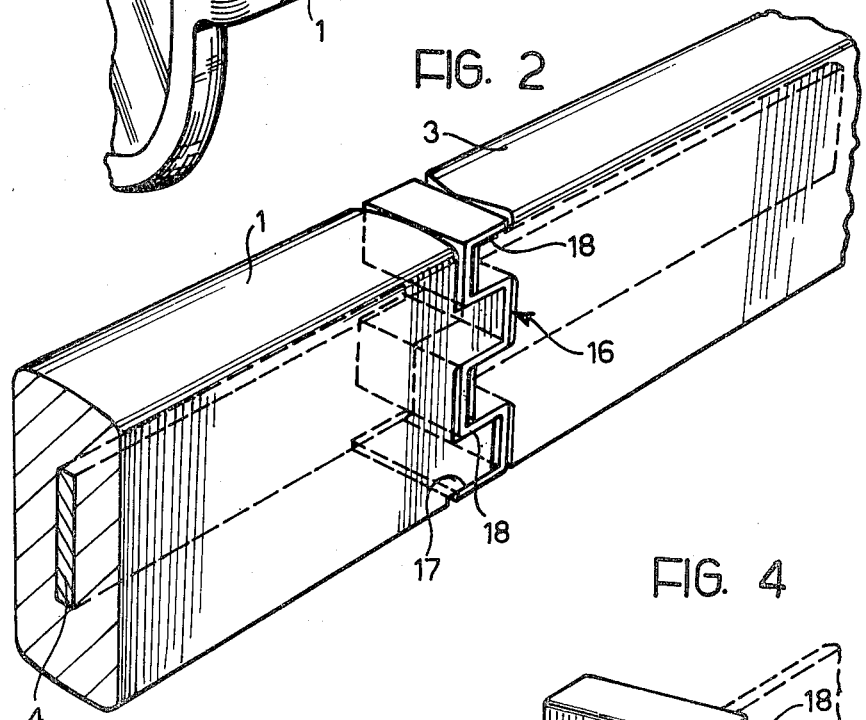
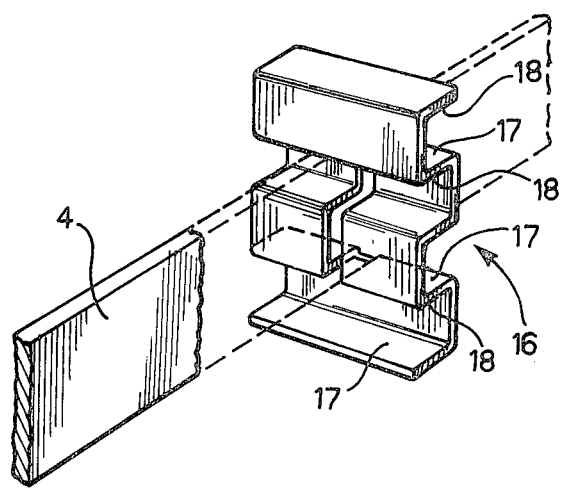

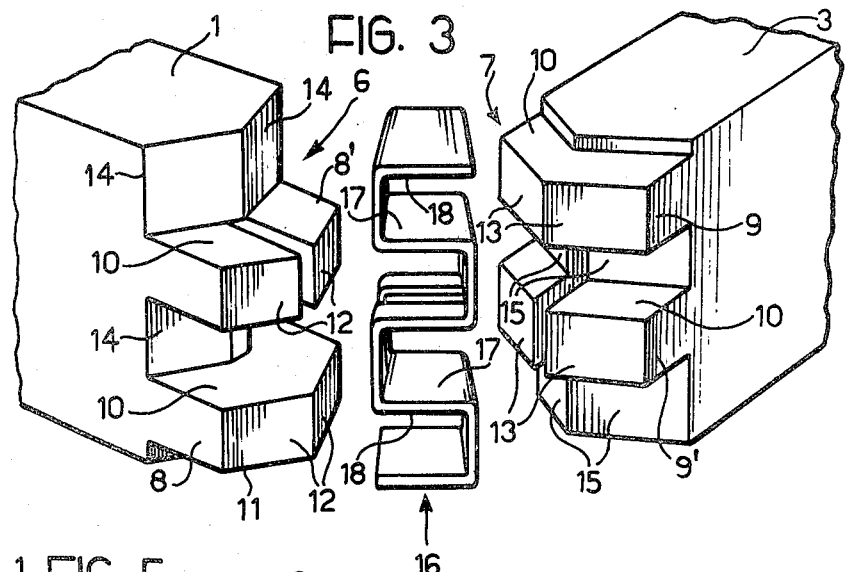
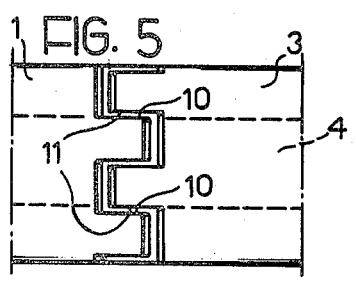
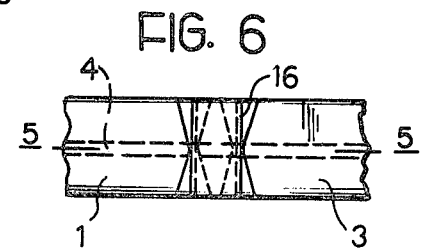
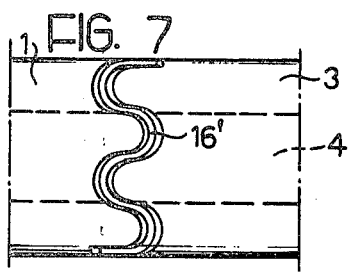
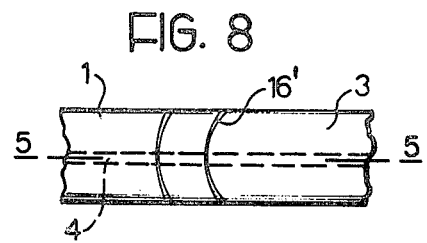
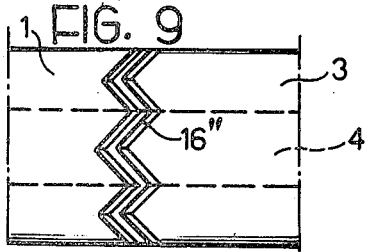
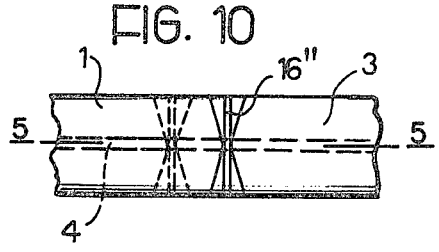

SPECTACLE FRAMES

The present invention relates to spectacle frame side arms capable of lateral articulation intermediate their ends to conform to the shape of a wearer's head.

One known type of spectacle side arm comprises a front part arranged to be hinged to the front of the frame, a rear part shaped to engage over the ear of the wearer and articulated at its forward end to the adjacent rear end of said front part, and a longitudinal reinforcing element which at least in the zone of articulation of said front and rear parts is in the form of a flexible lamina situated in the vertical longitudinal median plane of the spectacle side arm, the adjacent ends of the front and rear parts being so formed that their facing surfaces are spaced from each other by a distance which progressively increases away from said median plane.

Although spectable side arms of the aforesaid type possess adequate lateral adjustability to permit the frame shape to be adapted to that of the wearer's head, these side arms suffer from the disadvantage of having only a very limited resistance to torsion about their longitudinal axes in the zone of articulation between their front and rear parts.

As a consequence it has been found necessary to increase the height and thickness of the reinforcing lamina in the zone of articulation of the side arm; however this measure does not completely eliminate the tendency of the side arm to undergo excessive deformation in the presence of torsional stresses.

Accordingly, it is an object of the present invention to provide a spectacle side arm of the above specified type which is so formed as to minimise or substantially eliminate the effects of torsional stresses about the longitudinal axis of the arm without at the same time impeding the articulation of the front and rear parts of the arm relative to each other.

To this end the present invention provides a spectacle side arm of the aforesaid type wherein the said adjacent ends of the front and rear side-arm parts are each formed with tenons and mortices which extend transversely to the longitudinal direction of the side arm and respectively engage with the mortices and the tenons of the other side-arm part, each said tenon having two surfaces which at least partially face upwards and downwards respectively.

In referring to the side-arm median plane being vertical and to the tenons having surfaces at least partially facing upwards and downwards, it is to be understood that the side arm is to be considered in its normal orientation in use with the wearer's head upright.

Preferably when considered in a plane parallel to the said median plane, the adjacent ends of the front and rear side-arm parts each has a profile which is either of zigzag form or includes straight portions parallel to the longitudinal direction of the side arm. In the latter case the profile may further include portions perpendicular to the longitudinal direction of the side arm or curved portions which together with said straight portions make up a corrugated profile.

The height of each tenon considered perpendicularly to the longitudinal direction of the side arm can be made equal to that of the cooperating mortice, at least in correspondence with the longitudinal median plane of the side arm. Alternatively the tenons can be dimensioned such as to enable a metal spacer element to be interposed between the adjacent ends of the front and rear side-arm parts, this spacer element, having a profile, considered in a plane parallel to the arm median plane, which substantially conforms to that of the arm-part ends. The spacer element is arranged to contact the facing surfaces of the said adjacent ends of the side-arm parts at least in correspondence to the median plane of the side arm. A central slot is provided in the spacer element to allow the flexible reinforcing lamina to pass therethrough.

Three forms of a spectacle side arm embodying the invention will now be particularly described, by way of example, with reference to the accompanying diagrammatic drawings, in which:

FIG. 1 is a perspective view of part of a spectacle frame which incorporates a first form of the side arm;

FIG. 2 is an enlarged perspective view of a zone of articulation of the first form of the side arm;

FIG. 3 is an exploded perspective view showing to an enlarged scale, structural details of the portion of the side arm illustrated in FIG. 2;

FIG. 4 is a perspective view of two components of the first form of the side arm;

FIG. 5 is a side elevation of the zone of articulation shown in FIG. 2;

FIG. 6 is a plan view of the zone of articulation shown in FIG. 2;

FIG. 7 is a side elevation similar to that of FIG. 5, but relating to a second form of the side arm;

FIG. 8 is a plan view of the portion of the side arm shown in FIG. 7;

FIG. 9 is a side elevation similar to that of FIGS. 5 and 7, but relating to a third form of the side arm; and FIG. 10 is a plan view of the portion of the side arm shown in FIG. 9.

The first form of spectacle side arm (FIGS. 1 to 6) comprises a front part 1 hinged to the front 2 of the spectacle frame, (only a portion of the frame front 2 is shown in FIG. 1), and a rear part 3 shaped to engage the ear of the wearer. The front and rear parts 1 and 3 of the spectacle side arm are made in a plastics or similar material, with a reinforcing element 4, preferably in metal, running therethrough. This reinforcing element 4 carries at its forward end one component of the hinge by which the side arm is connected to the frame front 2. The reinforcing element 4 is in the form of a flexible lamina 4 located substantially in the longitudinally median plane 5—5 of symmetry (see FIG. 6) of the spectacle side arm.

The rear end of the side-arm front part 1 is articulated to the forward end of the rear part 3. As can be seen in FIG. 3 the opposing faces 6 and 7 of the adjacent ends of the side-arm parts 1 and 3 are each formed to define a pair of tenons 8, 8' and 9, 9' respectively. The two tenons of each pair are dispossed one above the other and extend transversely with respect to the longitudinal direction of the spectacle side arm across the full width thereof. These tenons delimit mortices, two such mortices being provided on the front side-arm part 1 respectively above the upper tenon 8' and between the tenons 8 and 8', and two further mortices being provided on the rear side-arm part 3 respectively between the tenons 9 and 9' and below the lower tenon 9'.

Each of the tenons 8, 8' and 9, 9' is delimited above and below by upwardly and downwardly facing surfaces 10 and 11 respectively which extend parallel to the longitudinal direction of the spectacle side element.

The tenon end surfaces 12 and 13 (that is, the surfaces 12 of the front-part tenons 8, 8' which face towards the side-arm rear part 3 and the surfaces 13 of the rear-part tenons 9, 9' which face towards the front part 1) are disposed at an angle to the perpendicular to the median plane 5—5. The back walls 14, 15 of the front and rear-part mortices respectively, are similarly angled to the perpendicular to the median plane 5—5. As a result, the spacing between the facing surfaces 6 and 7 of the adjacent ends of the side-arm parts 1 and 3 increases as the distance from the median plane 5—5 increases and thereby permits limited sideways articulation of the rear part 3 of the spectacle side arm relative to the front part 1.

A metal spacer element 16 (see FIGS. 3 and 4) is interposed between the mutually adjacent faces 6 and 7 of the front and rear parts 1 and 3. The spacer element 16 is composed of wall portions alternately parallel to and perpendicular to the longitudinal direction of the spectacle side element; these wall portions extend perpendicularly to the plane 5—5 across substantially the full width of the spectacle side arm. The element 16 is of uniform thickness and is dimensioned to receive the tenons 8, 8' and 9, 9' in interplaced relation in such a manner as to separate facing surfaces 10 and 11 of the interplaced tenons without leaving room for play. The spacer element 16 is formed with a slot 17 for the passage of the flexible reinforcing lamina therethrough.

The above described form of spectacle side arm is capable of sideways adjustment to adapt to the shape of the wearer's head, while at the same time effectively resists torsional stresses about its longitudinal axis. These stresses are in fact resisted by contact between the faces 10 and 11 of the tenons and the parallel surfaces 17 and 18 respectively, of the spacer element 16.

The same effect of resistance to torsional stresses in conjunction with the flexibility between the side-element parts 1 and 3, is provided by the second form of side arm shown in FIGS. 7 and 8 in which the tenons and mortices, and the spacer element 16, when viewed from the side present a corrugated shape with longitudinally extending portions connected together by rounded portions.

In the third form of side arm illustrated in FIGS. 9 and 10 the tenons, mortices and spacer element 16 are so shaped that when seen from the side they present a zigzag profile composed of successive portions inclined towards each other at equal angles relative to the longitudinal direction of the spectacle side arm.

Clearly in this case the contact between the metal spacer element 16 and the front and rear side-arm parts 1 and 3 will take place only in correspondence with the longitudinal median plane 5—5 from which it follows that the effects of torsional stresses, rather than being completely eliminated, are only mitigated.

Various modifications to the described embodiments are of course possible. Thus, for example, the metal spacer elements 16, 16' or 16" can be dispensed with provided that the side-arm parts 1 and 3 are made of materials of suitable wear and friction characteristics permitting unimpeded lateral articulation of the parts 1 and 3.

I claim:

1. A side arm for a spectacle frame, said side arm comprising a
   front part arranged to be hinged to the front of the frame,
   a rear part shaped to engage over the ear of the wearer and articulated at its forward end to the adjacent rear end of said front part, and
   a longitudinal reinforcing element which at least in the zone of articulation of said front and rear parts is in the form of a flexible lamina situated in the vertical longitudinal median plane of the spectacle side arm, the adjacent ends of said front and rear parts being so formed that their facing surfaces are spaced from each other by a distance which progressively increases as the distance from said median plane increases, and the said adjacent ends of the front and rear side-arm parts each being formed with tenons and mortices which extend transversely to the longitudinal direction of said side arm and respectively engage with the mortices and the tenons of the other said side-arm part, each said tenon having two surfaces which at least partially face upwards and downwards respectively.

2. A spectacle side arm according to claim 1, wherein, considered in a plane parallel to said median plane, each of the said adjacent ends of the front and rear side-arm parts has a profile which includes portions perpendicular to the longitudinal direction of the side arm.

3. A spectacle side arm according to claim 1, wherein, considered in a plane parallel to said vertical longitudinal median plane, the said adjacent ends of the front and rear side arm parts each has a corrugated profile.

4. A spectacle side arm according to claim 1, wherein, considered in a plane parallel to said vertical longitudinal median plane, the said adjacent ends of the front and rear side-arm parts each has a zigzag profile.

5. A spectacle side arm according to any one of claims 1 to 3, wherein, considered in a plane parallel to said vertical longitudinal median plane, the said adjacent ends of the front and rear side-arm parts each has a profile which includes portions parallel to the longitudinal direction of the side arm.

6. A spectacle side arm according to claim 1, wherein the height of each tenon considered perpendicularly to the longitudinal direction of the side arm and parallel to said median plane is equal to that of the cooperating mortice at least in correspondence to said median plane.

7. A spectacle side arm according to claim 1, wherein a metal spacer element is interposed between the said adjacent ends of the front and rear side-arm parts, said spacer element being so formed that considered in a plane parallel to said median plane, it presents a profile substantially in conformity with that of the said adjacent ends with the spacer element contacting their said facing surfaces at least in correspondence with the longitudinal median plane of the side arm, said spacer element being provided with a central slot for the passage of the said flexible reinforcing lamina therethrough.

8. A spectacle side arm according to claim 7, wherein said metal spacer element is of uniform thickness.

* * * * *